United States Patent [19]

Hirschberger

[11] 4,162,805
[45] Jul. 31, 1979

[54] DRIVE ARRANGEMENT FOR A MOVABLE VEHICLE PANEL

[75] Inventor: August Hirschberger, Munich, Fed. Rep. of Germany

[73] Assignee: Webasto-Werke W. Baier GmbH & Co., Fed. Rep. of Germany

[21] Appl. No.: 862,621

[22] Filed: Dec. 20, 1977

[30] Foreign Application Priority Data

Dec. 21, 1976 [DE] Fed. Rep. of Germany ....... 2657850

[51] Int. Cl.² .............................................. B60J 7/02
[52] U.S. Cl. ............................................. 296/137 G
[58] Field of Search .......... 296/137 G, 137 B, 137 E; 74/57, 58

[56] References Cited
U.S. PATENT DOCUMENTS

| 3,976,325 | 8/1976 | Schätzler | 296/137 G |
| 4,023,858 | 5/1977 | Bienert | 296/137 G |

Primary Examiner—Robert R. Song
Attorney, Agent, or Firm—Craig and Antonelli

[57] ABSTRACT

A drive arrangement for a movable panel member of a vehicle includes a rotatable driving member such as a drive pinion, which member is supported upon a shaft that is drivingly connected to a crank member so as to enable rotational movement of the crank to be transmitted to the pinion. To enable rotation of the crank to a stowage position in any panel member location, a lost motion device is provided for permitting substantially 360° of relative rotation between the crank and the pinion without rotation of the pinion. According to preferred embodiments of the invention the lost motion device is formed by a free travelling member being disposed between either the crank and the shaft or between the shaft and the pinion in the form of a ball contained in a pair of grooves, one of which is helical and the other of which is straight.

14 Claims, 8 Drawing Figures

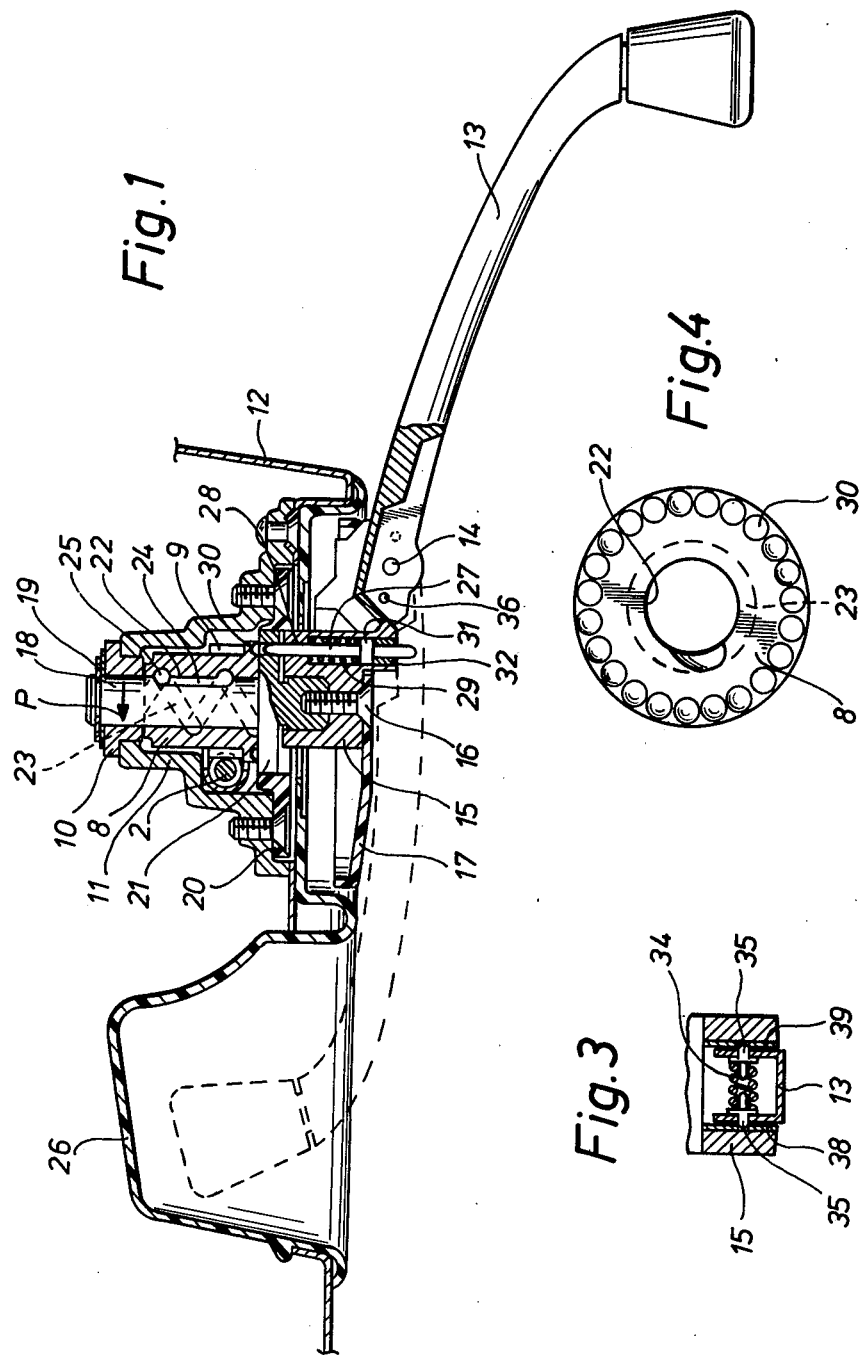

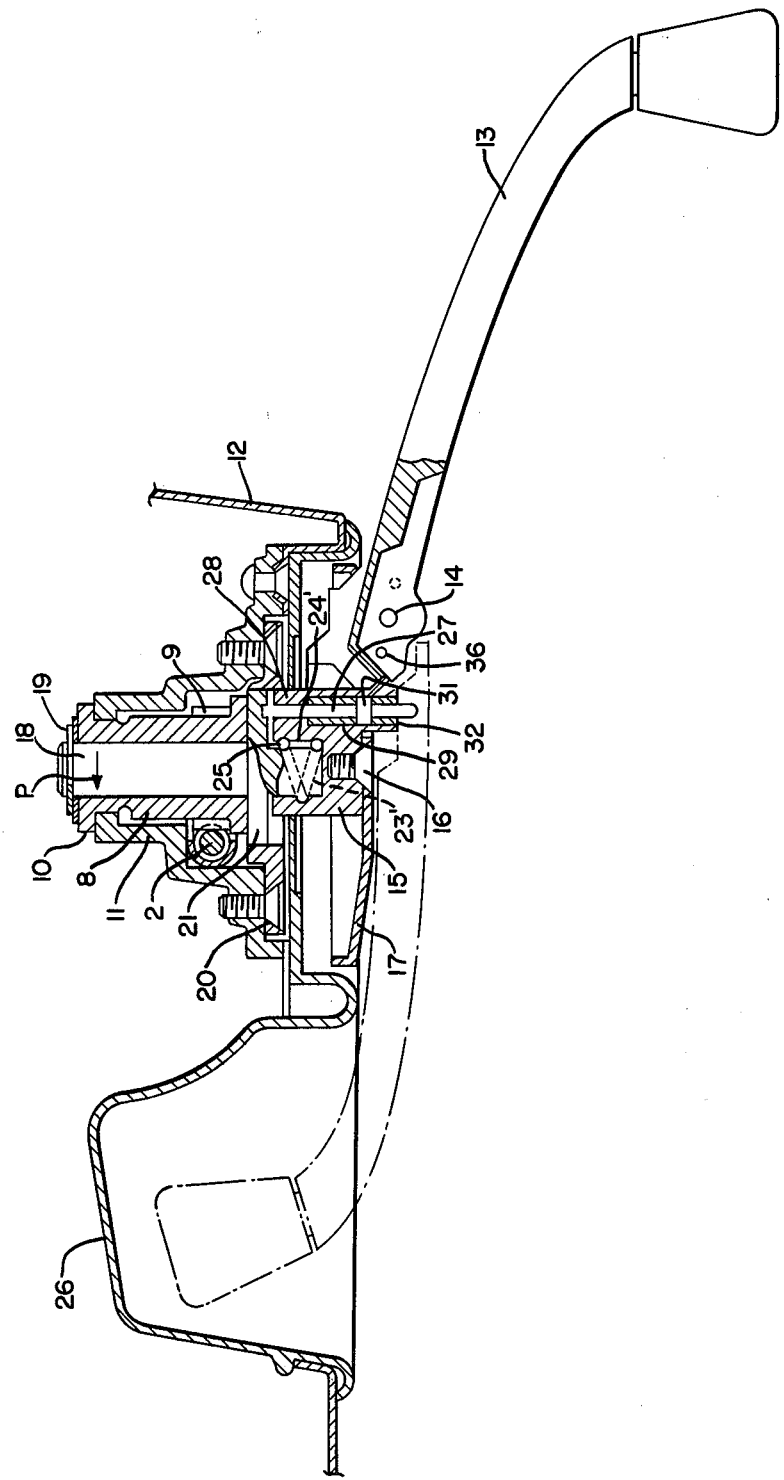

DRIVE ARRANGEMENT FOR A MOVABLE VEHICLE PANEL

BACKGROUND AND SUMMARY OF THE INVENTION

The invention relates to a drive device of the type used for tiltable and/or sliding covers, such as for a motor vehicle roof. Prior art covers have been movable by a drive actuated by a crank, the crank being connected to a shaft provided with a gear, said gear meshing with a drive pinion for the sliding mechanism of the cover in a driving relationship, or even constituting the drive pinion itself, whereby a niche is provided in the headlining, into which niche the crank can be folded in a certain position.

If the crank is connected rigidly with the cover by the drive, the crank will be in a position in which it can be folded into the niche only in a few positions of the cover. This circumstance is insignificant as far as normal sliding roofs are concerned, since half a turn of the crank, the maximum amount necessary to bring the crank arm into the folding position, does not result in very much displacement of the cover, so that the user can easily bring the sliding roof into a position in which the crank arm can be folded into the niche. In the case of tiltable covers, on the other hand, the problem arises that only a few, for example two, turns of the crank are provided for tilting the cover, so that the crank can be folded into the niche in only a few drive positions of the cover, and turning the crank through a half revolution, the maximum amount necessary to bring the crank into a folding position, results in a considerable change in the position of the cover. It would be desirable, however, if the crank could be folded away in the largest number of possible positions of the cover, preferably with the cover in any position. To achieve this goal, it has already been proposed (German Offenlegungsschrift No. 24 26 765 which corresponds to U.S. Pat. No. 3,976,325) to provide a releasable coupling between the hub of the crank and the drive pinion, so that the crank can be separated at any time from the drive mechanism, with the cover in any position, and turned so that it can be folded into the concave niche. However, a coupling of this kind is relatively costly and requires special actuation by the user, which is undesirable since his attention is distracted from the rod.

Additionally, it has been proposed, in commonly assigned co-pending Ser. No. 863,709, filed Dec. 23, 1977, U.S. Pat. No. 4,113,304 which is a continuation of U.S. patent application Ser. No. 772,675, filed Feb. 28, 1977 now abandoned, to mount a gear of a drive mechanism loosely on a shaft and provide a drive plate to rotate the gear by means of the shaft in both rotational directions, said drive plate being provided with a stop which cooperates with a stop on the gear. In this arrangement, play is provided between the shaft and the driving plate corresponding to the annular range determined by the circumferentially measured sum of the lengths of the stops. While the arrangement of Ser. No. 772,675 is an improvement over that of U.S. Pat. No. 3,976,325, the present invention is intended as a further improvement thereover.

Hence, a goal of the invention is to allow the crank to be folded away into the niche with the cover in any position, by simple means and without the requirement of special actuation.

This goal is achieved according to the invention by virtue of the fact that a free-running device (i.e. a freely traveling member such as a ball or roller bearing) is disposed between the crank and the shaft or between the shaft and the gear, allowing the crank to turn freely through 360°.

The proposal according to the invention makes it possible to turn the crank backward with the cover in any position (because of the free-running device) into a position in which it can be folded into the niche. No manually actuatable coupling is provided in the proposal according to the invention, so that the user can bring the crank into a folding position without having to turn his attention from the road.

An especially simple free-running device is achieved when a helical groove is provided in one of the parts to be coupled together and a straight groove is provided in the other one of the parts to be coupled, said straight groove running parallel to the lengthwise central axis of the helical groove and delimiting a receiving space for a locking ball with said helical groove, whereby the length of the straight groove corresponds to the pitch of the helix. When the cover is actuated, the locking ball is located at one end of the straight groove. If the crank is to be brought into a folding position with the cover in any position, the crank can be turned backward without driving the drive pinion, since the locking ball is displaced in the straight groove by the helical groove.

Preferably, the helical groove is located in the wall of the hole in the gear which accepts the shaft and the straight groove is located in the outside surface of the shaft.

In order to prevent the tilted cover from being moved out of position because of the free-running device by external influences, for example wind pressure, it is advantageous to provide a locking device which locks the free-running device when the crank is folded away, preventing the gear from turning. This locking device can be formed by a lengthwise displaceable pin, said pin being disposed in the crank hub mounted on the shaft and fitting into one of a plurality of depressions disposed along an arc in the underside of the gear when the crank is folded away. Alternatively, instead of a locking device of the type described above, spring means may be provided which tend to hold the cover in a tilted position, and hence to counteract the wind pressure which acts upon the cover as the vehicle moves.

These and other objects, features and advantages of the present invention will become more apparent from the following description when taken in connection with the accompanying drawings which show, for purposes of illustration only, preferred embodiments accordance with the present invention.

BRIEF DESCRIPTION OF THE DRAWINGS

FIG. 1 is a cross section through the crank drive and the corresponding drive of the sliding and tilting roof according to the invention, with the crank arm in the operating position;

FIG. 3 is a cross section along Line III—III in FIG. 2;

FIG. 4 is a bottom view of the drive pinion;

FIG. 8 is a cross sectional view, similar to FIG. 1, illustrating a modified version of the present invention.

DETAILED DESCRIPTION OF THE INVENTION

Figure 6:
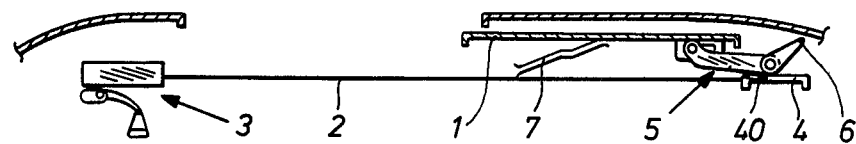
FIG. 6 is a representation corresponding to FIG. 5 wherein the sliding cover is slid back beneath the rear, fixed part of the roof.
Figure 7:
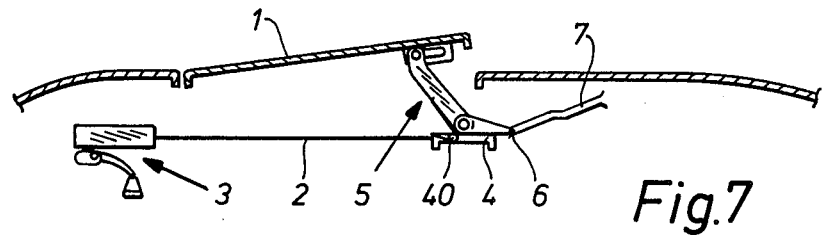
FIG. 7 is a representation corresponding to FIG. 5 wherein the sliding cover is tilted.

In the embodiment shown, sliding cover 1 can be both slid by an incompressible cable 2 via a crank mechanism 3 between its closed position (FIG. 5) and an open position (FIG. 6), as well as tilted to an open position (FIG. 7). Cable 2 is attached to a carriage bridge 4, supporting a lever mechanism 5, connected on the one hand with sliding cover 1 and guided on the other hand in a crank 7 at 6. Sliding and tilting roofs of this type are known and described for example in German Offenlegungsschrift No. 19 33 991.

Crank mechanism 3 is shown in detail in FIGS. 1 to 4. It is provided with a drive pinion 8, whose teeth 9 engage incompressible cable 2 and which is mounted on a shaft 18, said shaft being rotatably mounted by bearing elements 10 and 20 in a housing 11. Housing 11 is mounted to a part 12 of the fixed roof. A crank arm 13 serves to drive pinion 8, said arm being fastened swivelably at 14 to a hub 15, said hub being connected nonrotatably with shaft 18 by means of a screw 16. Screw 16 simultaneously attaches a cover plate 17 to hub 15. Shaft 18 is prevented from falling out by a lock ring 19, said ring abutting bearing element 10. Pinion 8 is supported at the bottom against stop 21 on shaft 18.

A helical groove 23 is provided in wall 22 of the bore of pinion 8 which accepts shaft 18, and a straight groove 24 is provided in the outside surface of shaft 18. The length of straight groove 24 corresponds to the pitch of helical groove 23. The two grooves 23 and 24 together delimit a space which accepts a locking ball 25. This locking ball 25 constitutes a firm connection for transmitting motion from shaft 18 to pinion 8 to displace cable 2 by means of crank arm 13, when it is located in the position shown in FIG. 1, whereat ball 25 is stopped in abutment with the upper end surface of straight groove 24, for rotation of shaft 18 in the direction of arrow P, or when ball 25 is stopped in abutment with the lower end surface of this groove 24 (FIG. 2) to rotate shaft 18 in the direction of arrow P'. Between these two positions of locking ball 25, shaft 18 can be turned relative to pinion 8, and through a complete revolution, since, as mentioned above, the length of groove 24 corresponds to the pitch of helical groove 23. Consequently, crank arm 13 can be turned without a simultaneous movement of cover 1, with cover 1 in any position, so that it can be folded away into niche 26 in the headlining.

Since pinion 8 can also rotate through one revolution relative to shaft 18, thereby enabling cover 1 to execute a corresponding movement, a locking device is provided in the example shown for pinion 8, said pinion having a pin 27 disposed in a bore 28 of hub 15 and being displaced upward against the action of a spring 29 by crank arm 13 when the latter is folded away into niche 26, so that it can mesh with its upper end in one of the numerous depressions 30 (FIG. 4) in the under side of pinion 8. In order to prevent pin 27 from falling out of bore 28 under the action of spring 29, it is provided with a bead 31, said bead abutting a bushing 32 pressed into bore 28 in the resting position shown in FIG. 1. As will be evident from FIG. 4 of the drawing, depressions 30 are arranged along an arc around the central axis of pinion 8. Instead of depressions, radial ribs can also be provided.

Figure 2:
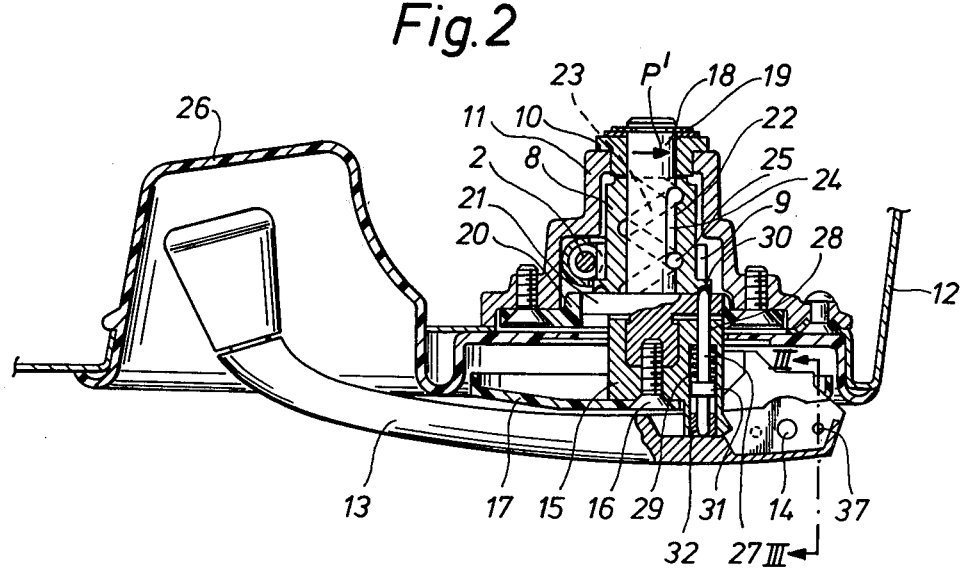
FIG. 2 is a cross section corresponding to FIG. 1, wherein the crank arm is swiveled into the depressed position shown by the dotted lines in FIG. 1.

In order to ensure that crank arm 13 is locked in the operating position as shown in FIG. 1 and also in the folded position shown in FIG. 2, two locking pins 35 are provided, said pins being located in crank arm 13 and pressed together by a spring 34. With the crank arm in the position shown in FIG. 1, these pins cooperate with depressions 36 and, with crank arm 13 in the position shown in FIG. 2, the pins cooperate with depressions 37 in locking plates 38 and 39, said plates mounted on crank hub 15. This locking arrangement prevents the folded crank arm 13 from being swiveled by spring 29.

Figure 5:
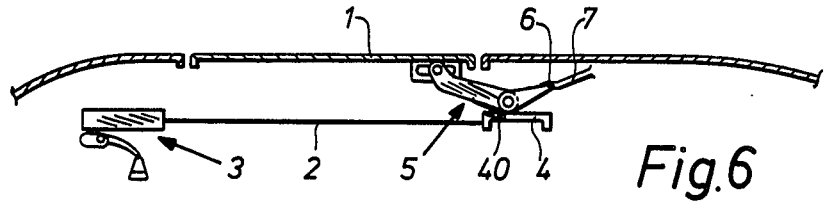
FIG. 5 is a schematic representation of a vehicle roof with a tiltable sliding cover in the closed position.

Instead of a locking arrangement of the kind described above and illustrated in FIGS. 1 and 2, a spring 40 indicated in FIGS. 5 to 7 can be provided, said spring tending to hold cover 1 in a tilted position, and hence counteracting the wind pressure acting upon cover 1 when the vehicle is in motion, by applying an upward biasing force to the lever mechanism 5.

The free-running device formed by grooves 23, 24 and locking ball 25 can naturally also be disposed between hub 15 and shaft 18, in which case pinion 8 is non-rotatably connected with shaft 18 such as by a key and slot (not shown). This modified arrangement is shown in FIG. 8, wherein the grooves are designated 23', 24', and the parts common to both arrangements are designated by the same reference numerals described with respect to the embodiment of FIG. 1. If it is desirable to gear down the transmission, the pinion can be meshed with the gear which drives cable 2 either directly or through intermediate gearing.

It is noted that while a preferred embodiment and modifications thereto have been described, other modifications will be apparent to those of ordinary skill in the art. Likewise, while the most preferred embodiment of the invention is a drive for tiltable sliding covers for a vehicle panel, various features of the present invention will find utility in various other similar devices having a crankdrive. Accordingly, the present invention should not be viewed as being limited other than by the scope of the appended claims.

I claim:

1. A drive arrangement for a movable vehicle panel member apparatus including a vehicle panel member and a driving means for moving said panel member with respect to adjacent vehicle structure, said driving means including:

a rotatable driving member which is drivingly connected to move said panel member in response to rotational movements of said driving member, said driving member having a first stop means, a rotatable shaft, a crank member drivingly connected to said shaft for applying rotational movement to said shaft, and transmission means carried by said shaft, said transmission means forming a second stop means engageable with said first stop means to rotate said driving member along with said transmission means, said first and second stop means being arranged so that said transmission means can be freely rotated from a first position with the second stop means engaging one end travel limit of said first stop means to a second position with the second stop means engaging an opposite end travel limit of said first stop means, said transmission means being formed by a freely traveling device disposed between said shaft and said rotatable driving member in a pair of grooves formed in surfaces thereof so as to enable said crank to move through substantially 360° without moving said panel.

2. A movable panel member apparatus according to claim 1, wherein a first of said pair of grooves is helical and the other of said grooves extends parallel to the lengthwise central axis of said helical groove, the length of said other groove corresponding to the pitch of said helical groove, and wherein the ends of said other of said grooves defines one of said stop means.

3. A movable panel member apparatus according to claim 2, wherein said rotatable driving member is a pinion having a bore within which said shaft is mounted, said helical groove being disposed in a wall of said bore, and said other of said grooves being depressed in an outer surface of said shaft.

4. A movable panel member apparatus according to claim 1, wherein said crank is foldable and provided with a hub which is fastened to said shaft, said hub containing a bore disposed substantially parallel to the axis of rotation of said shaft, said bore having a lengthwise displaceable pin therein, and said rotatable driving member having a plurality of depressions disposed along an arc in a bottom surface of said driving member, and wherein said pin is caused to be inserted within one of said depressions when said crank is in a folded position and wherein said pin is withdrawn from said depression upon unfolding of said crank.

5. A drive arrangement according to claim 1, wherein said vehicle panel member is a roof panel member.

6. A drive arrangement according to claim 5, wherein said driving means includes tiltingly and sliding moving said panel member with respect to adjacent vehicle structure.

7. A drive arrangement for a vehicle panel member apparatus of the type having a vehicle panel member and means facilitating the displacement of said panel member with respect to adjacent vehicle structure, said driving arrangement comprising:

a shaft, a drive pinion supported on said shaft, a crank member drivingly connected to said shaft for applying rotational movement to said shaft for rotating said pinion, and lost motion means for permitting substantially 360° of relative rotation between said crank and said pinion without rotation of said pinion, said lost motion means comprising a freely travelling member disposed in the outer surface of said shaft so as to project therefrom into cooperative relationship with said drive pinion for facilitating rotation of said crank to a stowage position in any panel member location.

8. A drive arrangement according to claim 5, wherein said lost motion means further comprises a pair of grooves within which said freely traveling member is located, a first of said grooves being helical and the other of said grooves extending parallel to the lengthwise central axis of said helical groove, the length of said straight groove corresponding to the pitch of said helical groove, and wherein the ends of said other of said grooves define stop means for said freely traveling member so as to enable transmission of rotation from said crank to said pinion.

9. A drive arrangement according to claim 6, wherein said helical groove is disposed in a wall of a bore of said pinion, said other of said grooves being located in the outside surface of said shaft, and said freely traveling member interconnecting said shaft and pinion.

10. A drive arrangement according to claim 6, wherein said helical groove is disposed in a wall of a bore of a hub associated with said crank, said other of said grooves being located in the outside surface of said shaft, and said freely traveling member interconnecting said shaft and hub.

11. A movable panel member apparatus according to claim 5, wherein said crank is foldable and provided with a hub which is fastened to said shaft, said hub containing a bore disposed substantially parallel to the axis of rotation of said shaft, said bore having a lengthwise displaceable pin therein, and said rotatable pinion having a plurality of depressions disposed along an arc in a bottom surface of said pinion, and wherein said pin is caused to be inserted within one of said depressions when said crank is in a folded position and wherein said pin is withdrawn from said depression upon unfolding of said crank.

12. A drive arrangement according to claim 5, further comprising spring detent means operatively associated with said crank member for retaining said crank in folded and unfolded positions.

13. A drive arrangement according to claim 7, wherein said vehicle panel member is a roof panel member.

14. A drive arrangement according to claim 13, wherein said drive arrangement includes means tiltingly and slidingly moving said panel member with respect to adjacent vehicle structure.

* * * * *